Patented July 21, 1925.

1,546,694

UNITED STATES PATENT OFFICE.

LEWIS W. WATERS, OF WILMINGTON, DELAWARE, ASSIGNOR TO E. I. DU PONT DE NEMOURS & COMPANY, OF WILMINGTON, DELAWARE, A CORPORATION OF DELAWARE.

FERMENTATION PROCESS.

No Drawing. Application filed August 30, 1919. Serial No. 320,937.

*To all whom it may concern:*

Be it known that I, LEWIS W. WATERS, a citizen of the United States, and a resident of Wilmington, in the county of New Castle and State of Delaware, have invented a certain new and useful Fermentation Process, of which the following is a specification.

This invention relates to a process of producing butyl alcohol and acetone by fermentation of sugars, and, more particularly, a process of this kind in which the fermentation is brought about by a heretofore unisolated bacteria which will be hereinafter designated bacillus aceto-butylicum.

The joint production of butyl alcohol and acetone by fermentation, thus broadly stated, is old, but the processes hitherto proposed have had certain disadvantages which have rendered difficult their practice on a commercial scale. Thus considerable difficulty is encountered in the isolation and maintenance of pure active cultures of the particular species of bacteria heretofore used in fermentations of this kind, and in cases where this species was anaerobic both the apparatus and the process were complicated by the necessity of excluding air and, in some cases, of working under reduced pressure. Another obstacle to the working of the old process on a commerical scale has been the difficulty of securing a fermentable material which is not only inexpensive but will permit of a high yield being obtained.

One of the objects of this invention is to provide a butyl alcohol-acetone fermentation process wherein the bacteria to be used may be readily isolated and kept in a condition capable of causing active butyl alcohol and acetone fermentation when transplanted into a suitable mash. Another object of my invention is to provide a process of this character wherein the bacteria used are capable of causing vigorous fermentation of carbohydrates with good yields of butyl alcohol and acetone in the presence of air, thus avoiding the great disadvantages entailed when working with anaerobic bacteria. Still another object of my invention is to provide a process for the production of butyl alcohol and acetone by the fermentation of inexpensive sugar solutions such as molasses, corn sugar, so-called "wood juice" and various other sugar solutions.

The species of bacteria which I prefer to use, and which possesses the desirable characteristics above mentioned, has been isolated and named by G. D. Horton and myself, bacillus aceto-butylicum; the manner of isolating this species of bacteria will be hereinafter described, but in order to facilitate their identification the species is described at this point in accordance with the descriptive chart of the Society of American Bacteriologists:—

Source—Corn meal.
Name—Bacillus aceto-butylicum.

I. *Morphology.*

1. Vegetable cells, motile:
    Media used—nutrient agar slant containing 1% corn starch, or 5% corn media (1 part corn meal in 20 parts water), temp. 32° C., age 24 hours.
    Form—short rods, chain formation.
    Size—2-4 microns×1-2 microns.
    Ends—rounded.
    Stain—evenly with Loeffler's methylene blue or gentian violet.
    Gram stain positive.
2. Sporangia:
    Media used—nutrient agar slant containing 1% corn starch, temperature 32° C., after 2 days spores formed.
    Form—oval. Spores central.
    Limits of size—1.6 microns×1.2 microns.
    Size of majority—1.6 microns×1.2 microns.
    Spores stain poorly with Loeffler's methylene blue.

II. *Cultural features.*

1. Nutrient agar slant media, age 24 hours, temp. 32° C.
    Growth—abundant.
    Form of growth—echinulate.
    Elevation of growth—raised.
    Luster—dull.
    Optical character—opaque.
    Topography—smooth.
    Odor—absent.
    Consistency—viscid.
    Media—clear.

2. Potato, 24 hours, 32° C.
    Growth—abundant.
    Form of growth—spreading.
    Elevation of growth—raised.
    Luster—dull.
    Topography—rugose.
    Odor—pleasant.
    Gas formation.
6. Nutrient broth.
    Surface growth—none.
    Clouding—moderate.
    Odor—none.
    Sediment—slight.
7. Milk.
    Coagulation prompt, with gas evolution.
  Clot digested.
8. Litmus milk.
    Acid, gas evolution, clot digestion.
10. Agar colonies, 24 hours, 32° C.
    Growth—rapid.
    Round—becoming irregular.
    Surface—smooth.
    Elevation—raised.
    Edge—entire.
    Internal structure—amorphous.
11. Starch agar (1% corn starch in nutrient agar).
    Growth—abundant.
    Diastatic action—marked.
17. Nitrogen source.
    Proteins, peptone.

III. *Physical and biochemical features.*

1. Fermentation tubes.
    Substances fermented with gas evolution.
        Dextrose+
        Saccharose+
        Lactose+
        Maltose+
        Glycerine—
        Starch+
        Galactose+
        Corn+
        Dextrine+
7. Optimum reaction of media:
    For growth and fermentation, Sorensen's $^PH$ values—5.0—6.3.
8. Vitality on culture media.
    Several months at 32° C.
9. Temperature relation.
    Optimum temperature 32° to 36° C.
    Spores resist 80° C. for 20 minutes.
10. Resistant to drying.
13. Acids produced, butyric.
15. Alcohol, butyl.
    Ketone, acetone.

*Isolation of the organism.*

After a careful investigation of the subject, the procedure adopted for isolating the bacillus aceto-butylicum was as follows:—

Test tubes of corn meal solution are prepared, heated to 80° C. for about twenty minutes to kill the less resistant bacteria, incubated at 32° C. without removing the air, and then watched closely for evidence of butyl alcohol fermentation. The culture in the tube or tubes which shows an active fermentation in the presence of air and yields a characteristic butyl alcohol odor, are in part transferred to a solid agar culture plate and the bacteria allowed to develope in colonies on its surface. Transfers are made from these colonies to fresh sterilized corn meal tubes and the type noted which produced the characteristic fermentation. This operation is repeated several times until agar plates are obtained which contain only the colonies of the desired type. Transfers are made to sterilized potato slabs from colonies which developed from a single organism and the bacillus is then retained in pure culture on sterilized potato by frequent transfers.

Although the morphological and cultural characteristics listed above are believed to appertain to, and identify, a single organism, designated B. acetobutylicum, and the carrying out of the above-described procedure is believed to isolate this B. acetobutylicum, it is, of course, possible that what has been supposed to be a single organism is a symbiotic combination of two organisms, or is a mixture of two different forms or modifications of the same organism.

In experiments with sugar solutions such as molasses it was found that such solutions ferment poorly and give yields of not over 4% mixed products on the basis of the fermentable sugar content. The cause for this was found to be that the nitrogen of the molasses is not in a form which is suitable for utilization by the organism. In working to overcome this difficulty I discovered that the corn proteins are particularly suitable as a source of nitrogen for bacterial metabolism, and that a remarkable increase in the yield of butyl alcohol and acetone by fermentation resulted when a small proportion of corn proteins was incorporated in the molasses before subjecting it to fermentation. I also discovered that fermentations of carbohydrates in general, that is, starches as well as sugars, are greatly promoted, as evidenced by the increased yields of butyl alcohol and acetone, by the presence of corn proteins in the solution or mash which is to be fermented by the bacillus aceto-butylicum.

In applying these discoveries I have incorporated commercial corn gluten as a source of nitrogen for the fermentation of various carbohydrate materials other than corn meal, neglecting the inherent nitrogen content of the material, and supplying the corn gluten in the proportion in which it exists in a 5% corn meal solution. For example, potatoes alone ferment poorly but by the addition of 0.35% corn gluten the yields on the basis of the starch approximated these from corn, i. e. about 30%. Cane sugar, or commercial corn sugar gave corresponding yields by the addition of corn gluten. The addition of other natural vegetable proteins, such as are contained in peanut meal, cotton seed meal, castor meal, improved the fermentations, but not to the same degree as corn gluten.

The new process as applied to molasses may be illustrated by the following example:—A platinum loop of bacteria is scraped from the surface of a potato culture and dropped into a test tube containing 10 cc. of a sterilized 5% corn meal solution. After incubation at 32° C. for about 46 hours the solution is added to 100 cc. of sterilized 2% corn meal solution, incubated at 32° C. for about 34 hours and transferred into 1000 cc. of sterilized 2% corn meal solution and incubated about 20 hours at 32° C.

The molasses solution is prepared for fermentation in the following manner:—corn gluten equal in amount to 0.35% of the weight of the final mash is soaked in water for several hours to soften and disintegrate it. It is then added to slightly more than twenty liters of a solution containing 6% of black strap molasses, which in general contains about 50% fermentable sugar, thus giving a 3% sugar solution. The molasses-corn gluten solution is boiled vigorously for half an hour, and then cooled to 32° C. so that its final volume is 20 liters.

The corn meal culture prepared as above described is now added to the molasses mash. The temperature is maintained from 32° to 36° C. The odor of butyl alcohol and acetone increases and at the end of from forty-eight to sixty hours the action ceases and the solution is distilled immediately. In several instances a yield of over 30% mixed products (butyl alcohol and acetone) on the basis of the fermentable sugar has been obtained, and in general typical fermentations give over 25%. Other products usually formed are butyric acid, hydrogen, ethyl alcohol and carbon dioxide. The proportion of butyl alcohol to acetone in yields from molasses seems to be higher than in similar yields from corn, and according to my investigations is between 2 and 2½ to 1.

If desired the smaller corn meal culture, obtained by adding the 10 cc. culture to the 100 cc. of sterilized 2% corn meal solution and incubating for about thirty-four hours, may be used directly to inoculate the molasses-corn gluten solution, but of course in this case, complete fermentation of said molasses solution will require a longer period.

The procedure set forth in detail in the above example may of course be modified in various ways without departing from my invention. The temperature for the fermentation should in general be between 30 and 40° C. and preferably from about 32 to 36° C. When working with starch mashes such as potato, barley, rice, and other grains, the proportion of starch present is preferably about 3%, and the corn gluten less than 1% and preferably about 0.35%.

The sugar mashes may be made from practically any source of fermentable sugar such as corn sugar, cane sugar, sugar solution obtained by hydrolysis of wood cellulose, molasses, and others. Although the proportion of fermentable sugar may range from 1 or 2% up to 5% or more in the mash, I have found it advantageous to use a mash containing about 3% of fermentable sugar, such as glucose, and less than 1% of corn gluten. In general, the proportion of corn protein should be less than 3% based on the weight of the mash.

The bacteria bacillus aceto-butylicum used in the above described process are facultative anaerobia, that is, their fermenting action is not materially influenced by a change in their environment with respect to oxygen. Consequently no effort need be made to insure the presence of air during the fermentation. The air is ordinarily excluded to a great extent by the evolution of gas from the fermenting mass, and of course air laden with bacteria is carefully excluded to prevent contamination. The advantage, however, in working with facultative anaerobes such as the bacillus aceto-butylicum is that it is frequently more convenient to avoid contamination by filtering the air than by excluding it entirely.

Although I prefer to use for the fermentation of carbohydrates pure strains of bacillus aceto-butylicum, my invention also includes the use of cultures obtainable from ordinary corn meal, and which remain active, and yield butyl alcohol and acetone, after being heated to 80° C. for about twenty minutes. The latter cultures, or cultures derived therefrom by a few transplantations, may give useful yields of butyl alcohol and acetone and yet may contain species of bacteria other than, and in addition to, the bacillus aceto-butylicum.

It will be understood that in expressions such as "a corn meal solution" and "molasses-corn gluten solution" etc. the word "solution" is used in a general sense to mean a mixture or suspension of the corn meal or corn gluten in water or in a molasses solution, respectively.

I claim:—

1. The process which comprises adding to a sterilized sugar mash, containing a vegetable protein readily assimilated by the bacteria which are to act as the fermenting agents, a culture of said bacteria which are derivable from ordinary corn meal, are sufficiently heat resistant to withstand a temperature of 80° C. for about twenty minutes, and are capable of producing butyl alcohol and acetone by fermentation, in the presence of air, of a sterilized corn meal solution, and maintaining the thus treated sugar mash at a temperature between 30 and 40° C. to set up an active fermentation therein.

2. The process which comprises adding to a sterilized sugar mash, containing corn gluten, a culture of bacteria which are derivable from ordinary corn meal, are sufficiently heat resistant to withstand a temperature of 80° C. for about twenty minutes, and are capable of producing butyl alcohol and acetone by fermentation, in the presence of air, of a sterilized corn meal solution, and maintaining the thus treated sugar mash at a temperature between 30 and 40° C. to set up an active fermentation therein.

3. The process which comprises adding to a sterilized mash of a carbohydrate material other than corn meal, but containing corn protein, a culture of bacteria which are derivable from ordinary corn meal, are sufficiently heat resistant to withstand a temperature of 80° C. for about twenty minutes, and are capable of producing butyl alcohol and acetone by fermentation, in the presence of air, of a sterilized corn meal solution, and maintaining the thus treated carbohydrate mash at a temperature between 30 and 40° C. to set up an active fermentation therein.

4. The process which comprises adding to a sterilized sugar mash, containing a vegetable protein readily assimilated by the bacteria which are to act as the fermenting agents, a culture of said bacteria which are derivable from ordinary corn meal, are sufficiently heat resistant to withstand a temperature of 80° C. for about 20 minutes, and are capable of producing butyl alcohol and acetone by fermentation, in the presence of air, of a sterilized corn meal solution, and maintaining the thus treated sugar mash at a temperature of from about 32 to 36° C. until fermentation is about completed.

5. The process which comprises adding to a sterilized sugar mash, containing corn gluten, a culture of bacteria which are derivable from ordinary corn meal, are sufficiently heat resistant to withstand a temperature of 80° C. for about twenty minutes, and are capable of producing butyl alcohol and acetone by fermentation, in the presence of air, of a sterilized corn meal solution, and maintaining the thus treated sugar mash at a temperature of from about 32 to 36° C. until fermentation is about completed.

6. The process which comprises adding to a sterilized mash of a carbohydrate material other than corn meal, but containing corn protein, a culture of bacteria which are derivable from ordinary corn meal, are sufficiently heat resistant to withstand a temperature of 80° C. for about twenty minutes, and are capable of producing butyl alcohol and acetone by fermentation, in the presence of air, of a sterilized corn meal solution, and maintaining the thus treated carbohydrate mash at a temperature of from about 32 to 36° C. until fermentation is about completed.

7. The process which comprises adding a culture of the hereinbefore described bacillus aceto-butylicum to a sterilized sugar mash containing a vegetable protein readily assimilated by said bacillus, and maintaining the resulting mixture at a temperature sufficient to bring about active fermentation.

8. The process which comprises adding a culture of the hereinbefore described bacillus aceto-butylicum to a sterilized sugar mash containing corn gluten, and maintaining the resulting mixture at a temperature sufficient to bring about active fermentation.

9. The process which comprises adding a culture of the hereinbefore described bacillus aceto-butylicum to a sterilized solution containing from about 1 to 5% of fermentable sugar and a smaller proportion, not exceeding 3% of corn gluten, and maintaining the resulting mixture at a temperature sufficient to bring about active fermentation.

10. The process which comprises adding a culture of the hereinbefore described bacillus aceto-butylicum to a sterilized mash of a carbohydrate material other than corn meal, but containing corn protein, and maintaining the resulting mixture at temperature sufficient to bring about active fermentation.

11. The process which comprises adding a culture of the hereinbefore described bacillus aceto-butylicum to a sterilized sugar mash containg a vegetable protein readily assimilated by said bacillus, and maintaining the resulting mixture at a temperature of from about 32 to 36° C. until fermentation is about completed.

12. The process which comprises adding a culture of the hereinbefore described bacillus aceto-butylicum to a sterilized sugar mash containing corn gluten, and maintaining the resulting mixture at a temperature from about 32 to 36° C. until fermentation is about completed.

13. The process which comprises adding a culture of the hereinbefore described bacillus aceto-butylicum to a sterilized solution containing from about 1 to 5% of fermentable sugar and a smaller proportion, not exceeding 3%, of corn gluten, and maintaining the resulting mixture at a temperature of from about 32 to 36° C. until fermentation is about completed.

14. The process which comprises adding a culture of the hereinbefore described bacillus aceto-butylicum to a sterilized mash of a carbohydrate material other than corn meal, but containing corn protein, and maintaining the resulting mixture at a temperature of from about 32 to 36° C. until fermentation is about completed.

15. The process which comprises adding to a sterilized sugar mash, containing a corn protein, a corn meal culture of the hereinbefore described bacillus aceto-butylicum, and maintaining the inoculated mash at a temperature sufficient to bring about vigorous fermentation.

16. The process which comprises adding to a sterilized sugar mash, containing a corn protein, a corn meal culture of the hereinbefore described bacillus aceto-butylicum, and maintaining the inoculated mash at a temperature of from about 32 to 36° C. until fermentation is about completed.

17. The process which comprises adding to a sterilized sugar mash, containing corn protein, a culture obtainable by inoculating a few cubic centimeters of a sterilized solution containing corn meal with the hereinbefore described bacillus aceto-butylicum growing on a solid culture medium, incubating the inoculated solution at about 32° C. for about 46 hours, adding the resulting solution to about ten times its volume of a sterilized 2% corn meal solution, and incubating the mixture at 32° C. for about 34 hours to induce therein a vigorous growth of the organism, and maintaining the sugar mash to which a culture of this character has been added at a temperature sufficient to bring about vigorous fermentation.

18. The process which comprises adding to a sterilized sugar mash, containing corn protein, a culture obtainable by inoculating about 10 cubic centimeters of a sterilized solution containing about 5% of corn meal with the hereinbefore described bacillus aceto-butylicum growing on sterilized potato, incubating the inoculated solution at about 32° C. for about 46 hours, adding the resulting solution to about ten times its volume of a sterilized 2% corn meal solution, and incubating the mixture at 32° C. for about 34 hours to induce therein a vigorous growth of the organism, and maintaining the sugar mash to which a culture of this character has been added at a temperature sufficient to bring about vigorous fermentation.

19. The process which comprises adding to a sterilized sugar mash, containing corn protein, a culture obtainable by inoculating a few cubic centimeters of a sterilized solution containing about 5% of corn meal with the hereinbefore described bacillus aceto-butylicum growing on a solid culture medium, incubating the inoculating solution at about 32° C. for about 46 hours, adding the resulting solution to about ten times its volume of a sterilized 2% corn meal solution, and incubating the mixture at 32° C. for about 34 hours to induce therein a vigorous growth of the organism, maintaining the sugar mash to which a culture of this character has been added at a temperature sufficient to bring about vigorous fermentation, and recovering the butyl alcohol and acetone resulting from the fermentation.

20. The process which comprises adding to a sterilized sugar mash, containing corn protein, a culture obtainable by inoculating about 10 cubic centimeters of a sterilized solution containing about 5% of corn meal with the hereinbefore described bacillus aceto-butylicum growing on sterilized potato, incubating the inoculated solution at 32° C. for about 46 hours, adding the resulting solution to 100 cubic centimeters of a sterilized 2% corn meal solution, and incubating the mixture at 32° C. for about 34 hours to induce therein a vigorous growth of the organism, transferring said mixture to 1000 cubic centimeters of sterilized 2% corn meal solution and incubating the mass for about 20 hours at 32° C., and maintaining the sugar mash to which a culture of this character has been added at a temperature sufficient to bring about vigorous fermentation.

21. The process which comprises adding to a sterilized sugar mash, containing corn protein, a culture obtainable by inoculating about 10 cubic centimeters of a sterilized solution containing about 5% of corn meal with the hereinbefore described bacillus aceto-butylicum growing on sterilized potato, incubating the inoculated solution at 32° C. for about 46 hours, adding the resulting solution to 100 cubic centimeters of a sterilized 2% corn meal solution, and incubating the mixture at 32° C. for about 34 hours to induce therein a vigorous growth of the organism, transferring said mixture to 1000 cubic centimeters of sterilized 2% corn meal solution and incubating the mass for about 20 hours at 32° C., maintaining the sugar mash to which a culture of this character has been added at a temperature of from about 32 to 36° C. until fermentation is practically completed, and then distilling the fermented solution to recover the butyl alcohol and acetone which has been formed.

22. The process which comprises adding a culture of the hereinbefore described bacillus aceto-butylicum to a sterilized mash containing about 3% of a fermentable sugar and a smaller percentage of corn protein, and maintaining the resulting mixture at a temperature sufficient to bring about active fermentation.

23. The process which comprises adding a culture of the hereinbefore described bacillus aceto-butylicum to a sterilized mash containing about 3% of glucose and a smaller percentage of a vegetable protein readily assimilated by said bacillus, and maintaining the resulting mixture at a temperature sufficient to bring about active fermentation.

24. The process which comprises adding a culture of the hereinbefore described bacillus aceto-butylicum to a sterilized mash containing about 3% of a fermentable sugar and less than 1% of corn gluten, and maintaining the resulting mixture at a temperature sufficient to bring about active fermentation.

25. The process which comprises adding to a sterilized mash containing about 3% of a fermentable sugar and a smaller proportion of corn protein, a culture of bacteria which are derivable from ordinary corn meal, are sufficiently heat resistant to withstand a temperature of 80° C. for about twenty minutes, and are capable of producing butyl alcohol and acetone by fermentation, in the presence of air, of a sterilized corn meal solution, and maintaining the thus treated sugar mash at a temperature sufficient to bring about active fermentation.

26. The process which comprises adding a culture of an organism capable of producing butyl alcohol and acetone by fermentation of a sterilized corn meal mash, to a sterilized mash containing a fermentable sugar and a protein readily assimilable by said organism.

27. The process which comprises adding a culture of an organism capable of producing butyl alcohol and acetone by fermentation of a sterilized corn meal mash, to a sterilized mash containing a fermentable sugar and a vegetable protein readily assimilable by said organism.

28. The process which comprises adding to a sterilized molasses mash containing a vegetable protein, a culture of an organism derivable from ordinary corn meal and capable of producing butyl alcohol and acetone by fermentation of a sterilized corn meal suspension in water, and maintaining the thus treated molasses mash at a temperature sufficient to bring about active fermentation.

29. A process as defined in claim 28 in which the vegetable protein is corn protein.

In testimony whereof I affix my signature.

LEWIS W. WATERS.